United States Patent [19]
Curtiss, Jr. et al.

[11] 3,872,907
[45] Mar. 25, 1975

[54] SAFETY SUPPORT DEVICE FOR PNEUMATIC TIRES

[75] Inventors: Walter W. Curtiss, Jr., Brimfield; Joseph M. Forney, Akron; William J. Hampshire, Peninsula, all of Ohio

[73] Assignee: The Goodyear Tire & Rubber Company, Akron, Ohio

[22] Filed: Oct. 1, 1973

[21] Appl. No.: 402,444

[52] U.S. Cl. .............................................. 152/158
[51] Int. Cl. ............................................ B60c 17/04
[58] Field of Search ................... 152/158; 301/39 T

[56] References Cited
UNITED STATES PATENTS

| | | | |
|---|---|---|---|
| 2,040,645 | 5/1936 | Dickinson | 152/158 |
| 2,045,341 | 6/1936 | Bourdon | 152/158 |
| 3,367,381 | 2/1968 | Aghnides | 152/158 |
| 3,435,872 | 4/1969 | Johnson | 152/158 |

FOREIGN PATENTS OR APPLICATIONS

| 1,082,822 | 6/1960 | Germany | 152/158 |

Primary Examiner—Drayton E. Hoffman
Attorney, Agent, or Firm—F. W. Brunner; M. L. Gill; P. E. Milliken

[57] ABSTRACT

A safety or emergency insert device positioned on a wheel rim inside a tire chamber to support the tire in a deflated condition. The device has an annular support surface beneath the tread adjacent each shoulder of the tire and when used with a belted tire, the support is beneath the axially outer edges of the belt. The device also has a sidewall buffer portion on each side which prevents excessive axial shifting of the sidewall during turns and upon deflation of the tire and a portion for preventing axially inward movement of the tire bead on the rim. In a preferred embodiment, the device has two annular resilient rings mounted on the rim in opposed relationship to each other.

26 Claims, 14 Drawing Figures

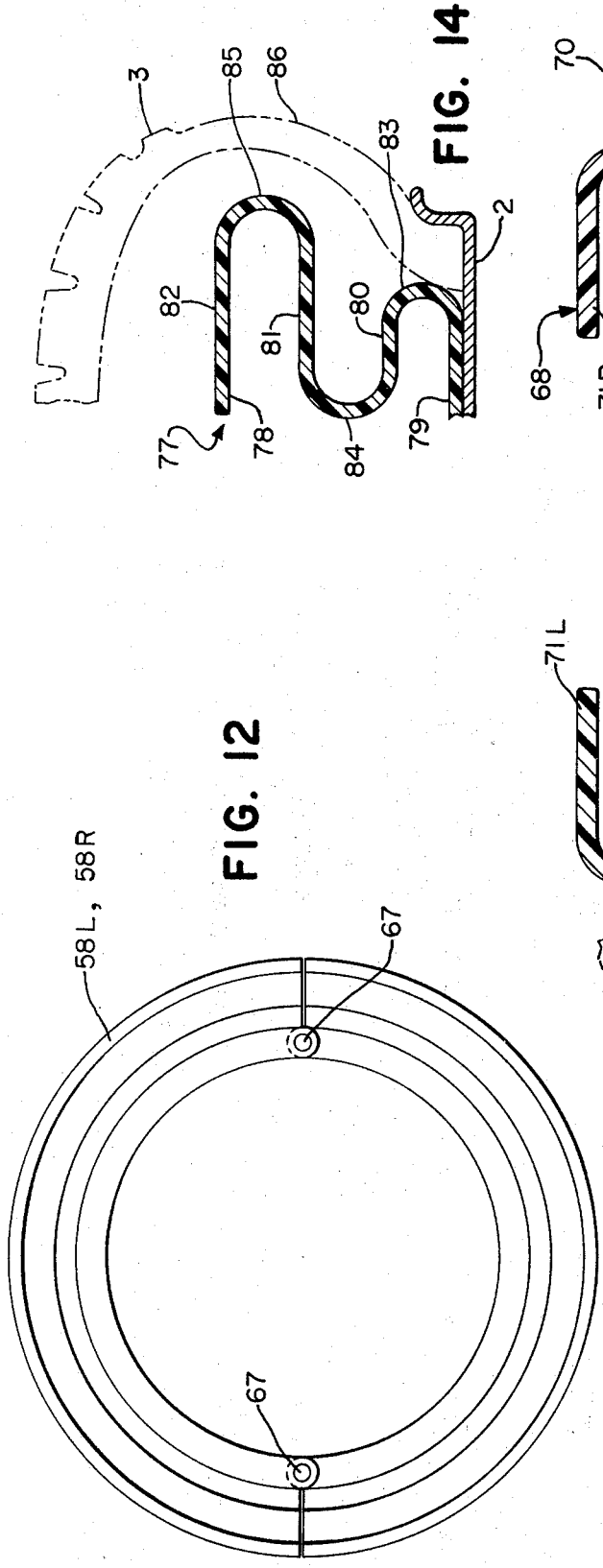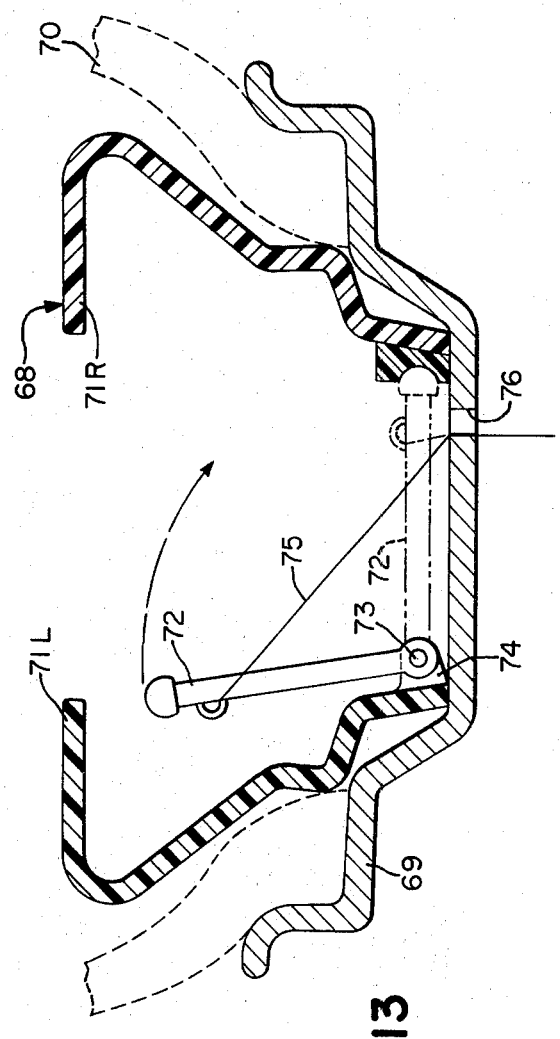

SAFETY SUPPORT DEVICE FOR PNEUMATIC TIRES

This invention relates to a safety emergency insert device for use on a wheel rim inside a tire chamber to support the tire in a deflated condition.

BACKGROUND OF THE INVENTION

In the past, various devices have been proposed for supporting tires in a deflated or run flat condition. Some devices have been located outside of the tire chamber while many have been positioned inside the tire chamber and attached in some manner to the wheel rim. Most prior devices have concentrated on supporting the axial center of the tire tread rather than in providing support for the axial outer edges of the tire adjacent the shoulder. Such prior devices have not been entirely satisfactory in solving the problem since in many cases the tire did not have sufficient lateral stability and tended to shift from side to side thereby creating problems in steering and building up unwanted friction and heat in the tire and unseating of the tire beads. The problem of lateral stability is often present where no interal support or buffer is used near the inner surface of the tire sidewalls to prevent excessive axial movement of the sidewalls when the tire is in a run flat condition. Another problem which has been encountered in run flat devices is that due to the substantial difference in the circumferential dimension of a tire and a support ring inside the tire, there is substantial relative circumferential movement between the tire and support device which can create friction and heat which can damage the tire.

OBJECTS OF THE INVENTION

It is an object of this invention to provide a safety insert device positioned on a wheel rim which will support a pneumatic tire in a deflated or run flat condition.

It is a further object of the invention to provide a safety support device for a flat tire which will provide greater lateral stability to the tire while in a run flat condition.

Another object of the invention is to provide a safety support device which will prevent excessive axial movement of the sidewalls when the tire is in a run flat condition.

A still further object of the invention is to provide a safety support device which will minimize the axial and circumferential friction between a tire and the support device and heat generated thereby when the tire is in a run flat condition.

A further object of the invention is to provide a safety support device which will prevent excessive axial inward movement of the tire beads along the bead seats of a wheel rim on which the tire is mounted.

These and other objects of the invention will become more fully apparent as the description proceeds in the following specification and the accompanying drawings.

BRIEF DESCRIPTION OF THE DRAWINGS

FIG. 12 is a side view of the tire support device of FIG. 11;

FIG. 13 is a cross-sectional view of another embodiment of the tire support device on a one-piece drop center rim; and FIG. 14 is a fragmentary cross-sectional view of another embodiment of the invention.

DESCRIPTION OF THE PREFERRED EMBODIMENTS

Figure 1:
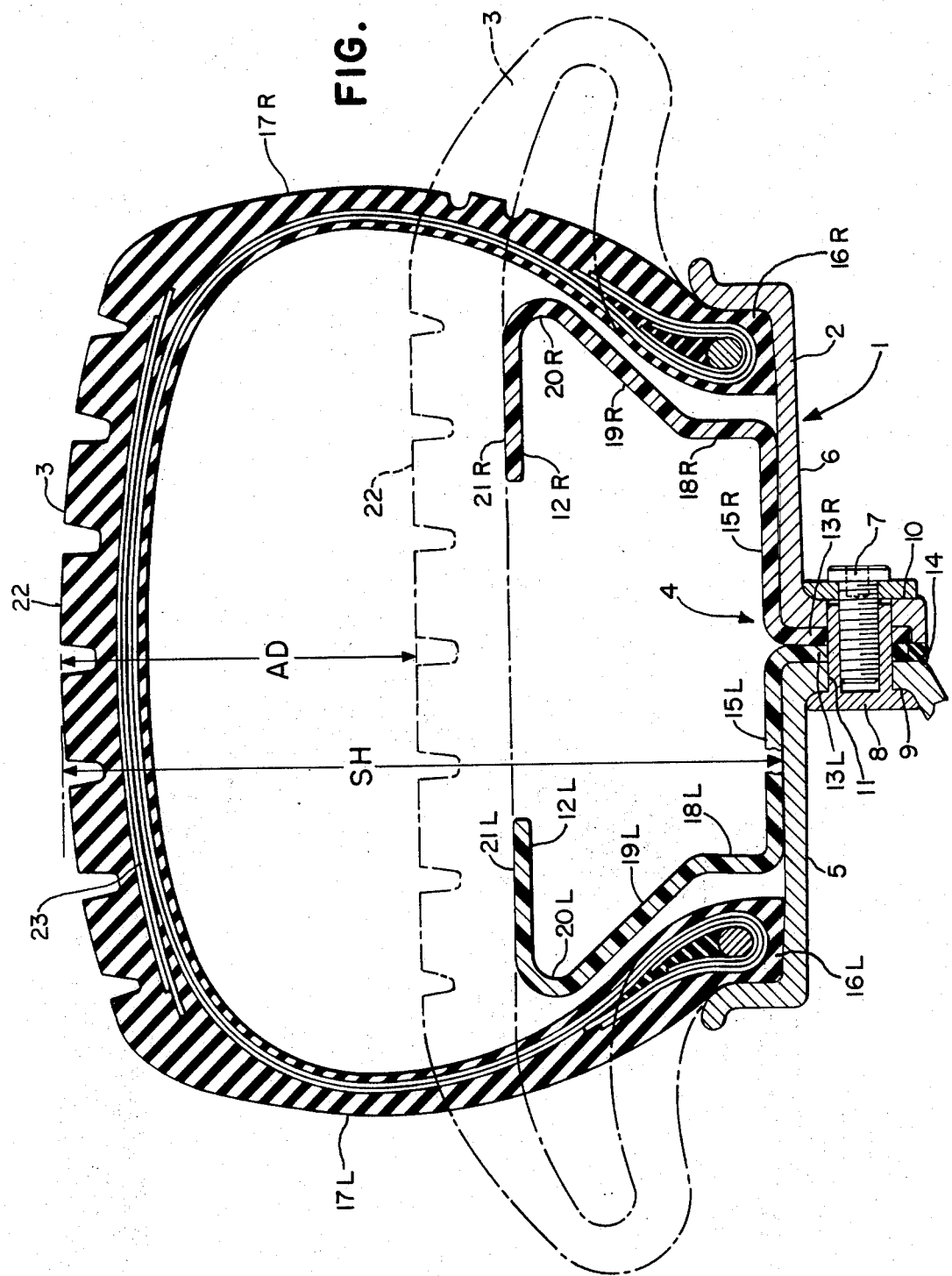
FIG. 1 is a cross-sectional view of a preferred embodiment of a safety support device of the invention mounted on a wheel rim within a tire chamber with the section being taken along a radial plane passing through the axis of the tire and rim.

Referring now to FIG. 1, an assembly 1 includes a vehicle wheel rim 2 having a pneumatic tire 3 mounted thereon and a tire support device 4 positioned within the chamber of the tire 3 and fastened to the wheel rim 2. As shown in FIG. 1, the wheel rim is a two-piece rim having two annular sections 5 and 6 bolted together by a bolt 7 engaging a retaining nut 8. A series of the bolts 7 and nuts 8 are spaced circumferentially around radially inwardly extending flanges 9 and 10 of rim sections 5 and 6 respectively and pass through a plurality of holes 11 through flanges 9 and 10. The flange 9 of rim section 5 extends radially inwardly beyond the flange 10 and has a portion not shown which connects to a standard wheel hub. While the tire support device is shown in most instances in this specification as being mounted on a two-piece or split wheel rim, the device may also be used with a one-piece rim if suitable modifications are made in the manner of mounting the device on the rim. The tire support device 4 as shown in FIG. 1 is comprised of two substantially identical annular rings indicated as 12L and 12R. The rings 12L and 12R have respectively radially inwardly extending flanges 13L and 13R which are positioned together in face-to-face relationship between the flanges 9 and 10 of the wheel rim 2. The bolts 7 and nuts 8 hold together sections 5 and 6 of the wheel rim with the flanges 13L and 13R securely held therebetween. A seal ring 14 is positioned between the flanges 9 and 10 to prevent leakage of air from the tire chamber. In such instance sealing must be provided around the bolts by gaskets or other suitable means. In some instances it may be preferable to place the seal radially outwardly of the bolts 7, thus eliminating the need to seal around the bolts.

Extending axially outwardly from the radially outward portion of the flanges 13L and 13R respectively are lateral annular base portions 15L and 15R which extend to near the inner surface of tire beads 16L and 16R and then turn radially outwardly to form annular bead-retaining portions 18L and 18R which in turn merge into axially outwardly inclined frustoconical sidewall buffer portions 19L and 19R. The portions 19L and 19R at their radially outer ends merge into annular curved portion 20L and 20R which curve axially inwardly and integrally join with axially inwardly extending tire support portions 21L and 21R.

The tire support portions 21L and 21R as shown are substantially parallel to the axis of the wheel and tire. However, in some instances it may be desirable for the support portions to be inclined at an angle depending upon the particular characteristics of the tire being supported, the wheel camber of the vehicle and other factors.

A tread portion 22 extends circumferentially about the tire 3 and includes a ground-contacting surface. For purposes of this invention, the ground-contacting portion of the tread shall be construed to mean that portion of the tread which is in contact with a flat surface when the tire is inflated to design inflation pressure and loaded statically to a design load. A pair of sidewalls 17L and 17R extend radially inwardly of and from the axially outer edges of the tread 22 and terminate in radially inwardly directions in the pair of annular inextensible bead portions 16L and 16R. In the particular embodiment illustrated, the tire 3 includes a belt or breaker structure 23 which is disposed beneath the tread portion 22 and extends circumferentially about the tire. The belt or breaker structure 23 may be composed of one or more layers of a reinforcing material such as, by way of example only, tire cord fabric and, as is customary in such tires, extends in axial directions to a point generally in the area of the axially outer edges of the ground-contacting surfaces.

One of the primary features of this type support device is that it provides support near the axially outer edges of the ground-contacting surface of the tread. The supporting surface is located axially inwardly of the axially outer extremity of the ground-contacting surface. In the case of a belted tire, the support is provided in an area axially inwardly of the axially outer edges of the belt.

By providing the primary support near the axial outer edges of a tire tread rather than in the axial center of the tread, greater stability of the tire is achieved in a run flat condition. The area of the tread supported by the support portions 21L and 21R may vary; however, as an optimum, it is preferable that the tread be supported across 40 percent of the tread width; however, supporting the tire across 10–60 percent of the tread width should provide satisfactory results. The tread width as used in this specification is defined as the width of ground contact area of the tire under design inflation and load and in a static condition. In most instances, the area of support of the tire tread is evenly distributed between support portions 21L and 21R. However, there may be certain circumstances in which it would be preferable to provide a larger area of support on one side of the tire than on the other.

The allowable drop indicated by the letters AD shown in FIG. 1 determines the outer diameter of the support portions 21L and 21R. The optimum allowable drop for a tire used with the present invention is 50 percent of the tire section height indicated in FIG. 1 by the letters SH. The section height SH is the distance measured radially of the tire from a bead base line to the radially outermost point on the tread 22 when the tire is inflated to design inflation pressure and unloaded. A very satisfactory range of allowable drop for a tire is between 30 percent to 60 percent of the section height of the tire. In some instances this range may be as broad as 20 percent to 80 percent of the sectional height of the tire. One limitation that must be taken into consideration, however, is that the outside diameter of the supporting surfaces 21L and 21R must be sufficiently small that the rings 21L and 21R can be passed through the tire bead opening. While it is possible to make the tire support device 4 from a substantially rigid material, it is preferable that this device be made from a resilient material such as fiber-reinforced plastic or the like which will provide a cushioning effect as a substitute for the cushioning effect which is lost when the tire becomes deflated. Such cushioning effect minimizes the transmission of unwanted vibrations caused by contact of the rolling wheel with the road to the vehicle suspension system. The radius of curvature of the curved portions 20L and 20R have a bearing on the amount of resiliency or vibration damping that will be present in the support portions 21L and 21R. The effect of using a larger radius of curvature will be discussed in further detail in the description of FIG. 2. In FIG. 1 the tire 3 in the inflated condition is shown in solid lines and in the deflated condition is shown in chain-dotted lines. When the tire 3 is resting on the support portions 21L and 21R as indicated by the chain-dotted lines, the support for the tire is provided in the areas directly beneath the portions of the belt 23 axially inwardly of the axially outer edges thereof. When used with a tire which does not have a belted construction, the support portions support the tire in an area axially inwardly of the shoulder portion of the tire or the axially outer edges of the tread. Another important feature of this support device 4 is the side wall buffer portions 19L and 19R which limit any possible inward buckling of the sidewalls of a deflated tire, thereby providing greater stability to the tire. The tire is further stabilized by the bead-retaining portions 18L and 18R which minimize lateral shifting of the tire beads 16L and 16R along the wheel rim 2. The support portions 21L and 21R are in the form of flat relatively thin hoops which deflect radially when subjected to radial loads. The bead retaining portions 18L and 18R and the sidewall buffer portions 19L and 19R together form generally radially extending side rings which deflect little if any under radial loads. The main deflection, therefore, occurs in the hoop portions 21L and 21R with some deflection occurring in the curved portions 20L and 20R, but the most deflecting occurring at the unsupported edges of the support portions 21L and 21R. As shown, the two annular rings 12L and 12R of the support device 4 are spaced axially inwardly from the tire bead and sidewalls to permit flexing of the tire when inflated without rubbing against the support device. In some configurations, however, the support device may be in contact with the tire in at least some portions of the bead and sidewall. Whether or not the support device 4 is spaced from the tire depends upon the particular design configuration involved and the requirements which are needed. While it is preferred in most instances that the support device be fixed in all directions with respect to the rim as is the device shown in FIG. 1, it is most important that it be fixed in the axial direction with respect to the rim.

Figure 2:
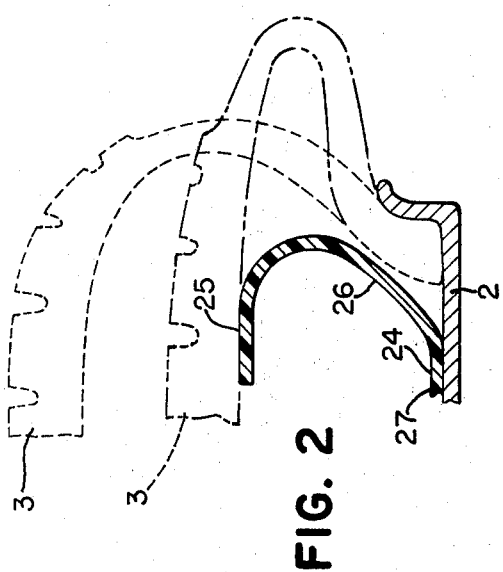
FIG. 2 is a fragmentary cross-sectional view of another embodiment of the invention.

FIG. 2 shows a vehicle wheel rim 2 with a tire 3 mounted thereon identical to FIG. 1. A tire support device 24 is mounted on the rim 2 in a manner similar to that shown in FIG. 1. The method of connecting the support device to the rim has been omitted to simplify the drawing. The support device 24 is similar to the device 4 since it has a tire supporting portion 25 extending axially inwardly in the same manner as the tread support portion 21R. However, the support device 24 has a large radius of curvature in the substantially U-shaped portion 26 which connects the base portion 27 with the tread support portion 25. The large radius of this connecting curved portion 26 provides greater deflection of the tread support portion 25 when it is subjected to the pressure of the tire in the run flat condition.

Figure 3:
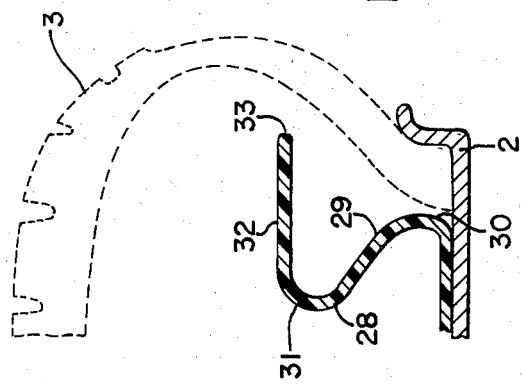
FIG. 3 is a framentary cross-sectional view of still another embodiment of the invention.

FIG. 3 shows another modification in which a tire support device 28 is positioned on a wheel rim 2 having a tire 3 thereon. The support device 28 differs from that shown in FIG. 1 in that unlike the sidewall buffer portion 19R of FIG. 1 which is inclined axially outwardly, the support device 28 has a portion 29 which is inclined axially inwardly from a tire bead retaining portion 30 and merges into a curved portion 31 which curves axially outwardly and merges integrally with an axially outwardly extending tread support portion 32. In this embodiment, the axial support of the tire sidewall must be accomplished by the axial outer edge 33 of the tread support portion 32.

Figure 4:
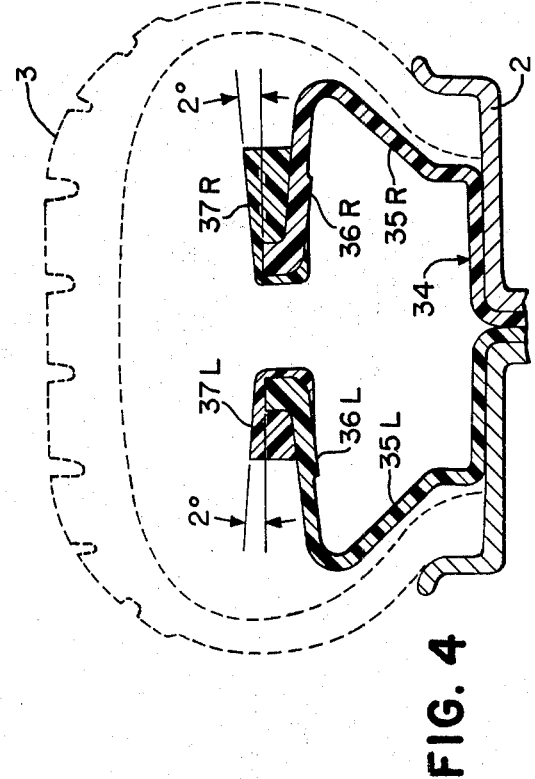
FIG. 4 is a cross-sectional view of an embodiment of the invention in which compensation is provided for the camber of the wheels.

FIG. 4 shows an embodiment quite similar to FIG. 1 in all respects except that the support device indicated by the numeral 34 has a pair of annular ring sections 35L and 35R which in turn have respectively tread support portions 36L and 36R. The portions 36L and 36R have molded thereon annular rings 37L and 37R of urethane or other suitable material which provides support surfaces for the tire beneath the axially outer portions of the tread. As shown in FIG. 4, the radially outer surfaces of the rings 37L and 37R are inclined at approximately a 2° angle with respect to a plane parallel to the axis of the wheel and tire. The basic reason for this angle is to facilitate removing rings 37L and 37R from a mold. The ring 37R is made with a greater axial width than the ring 37L. This difference in width in conjunction with the angle of inclination of the outer circumference of the rings 37L and 37R provides compensation for the camber of the wheel of the vehicle on which the device is used and of the slope of the highway. For example, in the configuration shown in FIG. 4 since the ring 37L is narrower in the axial direction than 37R and the angle of inclination is the same on both radially outer surfaces, this means that the largest diameter of 37L is less than the largest diameter of 37R. This compensates for a camber angle of a wheel leaning toward the left. Such compensation can also be accomplished by making the rings the same axial width but varying the inclination of the angle of the outer circumference of one ring with respect to the other. If 37L and 37R are made with the same axial width and with the angle of inclination of 37R greater than that of 37L, then the largest diameter of 37R would be greater than the largest diameter of 37L and the same camber compensation would be provided as is achieved by the example illustrated in FIG. 4. In compensating for camber the desired objective is to position the two support rings in such manner that the forces acting on them are equalized.

Figure 5:
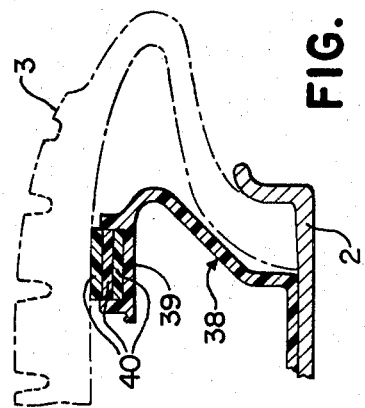
FIG. 5 is a fragmentary cross-sectional view of an embodiment of the invention similar to that shown in FIG. 1 but including annular friction-reducing bearings on the tire support device.

FIG. 5 shows an embodiment substantially identical to FIG. 1 except that the tire support ring device 38 has a tread support portion 39 which carries a plurality of friction-reducing bearing rings 40 which can rotate circumferentially in the direction of rotation of the wheel. The movement of the rings 40 reduces the friction between the tire support device 38 and the supported surface of the tire 3 thereby reducing the friction and build-up of heat which might otherwise damage the tire during a run flat condition. Such friction is caused by the tire having a greater circumferential dimension than the support devices. When the tire 3 is deflated and running flat against the support device 38, there is a substantial amount of relative circumferential movement between the tire 3 and the support 38.

Figure 6:
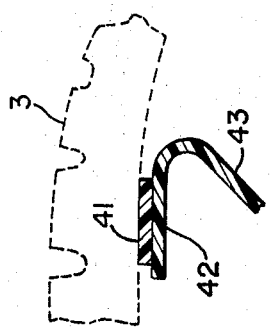
FIG. 6 is a framentary view of a portion of the tire support device similar to that shown in FIG. 1 but having a friction-reducing member attached to the tire supporting surface of the safety device.

FIG. 6 shows another friction-reducing device similar to FIG. 5 except that instead of the rotatable friction-bearing rings 40, a fixed ring member 41 surrounds the tread support portion 42 of the tire support device 43. The ring 41 is made of a material having a low coefficient of friction to reduce heat build-up due to rubbing of the tire against the surface of the ring 41.

Figure 7:
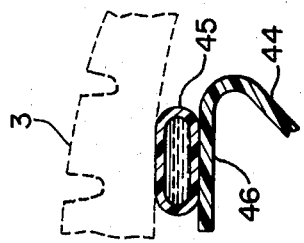
FIG. 7 is a fragmentary view of a tire support device similar to that shown in FIG. 1 but having a lubricant reservoir mounted on the tire-supporting surface of the device.

FIG. 7 shows a portion of a tire support device 44 similar to the device 4 shown in FIG. 1 except that it has a reservoir 45 for containing lubricant attached to the outer circumference of the tread support portion 46. When the tire 3 becomes deflated and the tire support device 44 bears against the inner surface of the tire, the reservoir 45 is broken either by the pressure between the tire and the support portion 46 or the subsequent friction of the tire rubbing against the reservoir 45 as the wheel rotates while riding on the tire in the run flat condition.

Figure 9:
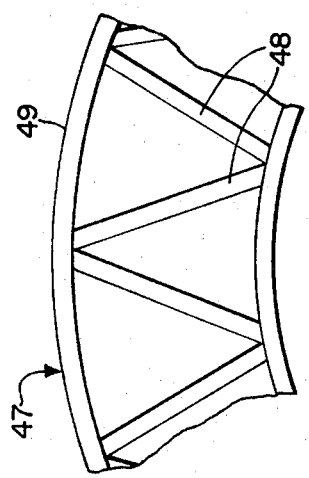
FIG. 9 is a fragmentary side elevational view of the support device shown in FIG. 8.
Figure 8:
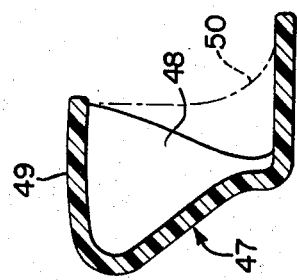
FIG. 8 is a fragmentary cross-sectional view of a tire supporting device similar to that shown in FIG. 1 but having reinforcing ribs or webs.

FIG. 8 shows a tire suppport device 47 which is similar in cross-sectional contour to the left annular ring 12R shown in FIG. 1. FIGS. 8 and 9 illustrate how the device can utilize ribs or webs 48 to provide additional support for the tread supporting portion 49 while maintaining a desired amount of resiliency in the device when subjected to dynamic load during a run flat condition. As indicated in the dotted line 50, the web 48 can be contoured in various ways to achieve different degrees of resiliency in the device.

Figure 10:
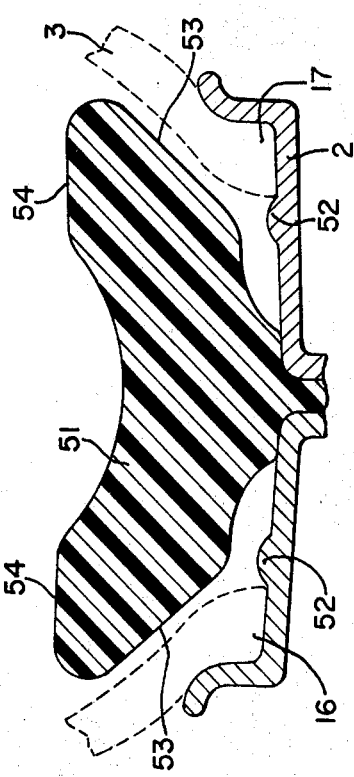
FIG. 10 is cross-sectional view showing another embodiment of a tire support device mounted on a rim.

FIG. 10 shows another embodiment of the invention in which a molded resilient tire support device 51 is mounted on a wheel rim 2 in the same manner as the device shown in FIG. 1. The tire 3 is retained on the bead seats by a pair of humps 52 adjacent to the inner edge of the beads 16L and 16R of the tire 3. With the humps 52 it is not necessary to provide for bead retention by the tire support device 51. The device 51 does, however, have a sidewall buffer portion 53 on each lateral side thereof adjacent to the sidewalls of the tire and a pair of spaced-apart tread support surfaces 54 on the outer circumference of the tire support device 51.

Figure 11:
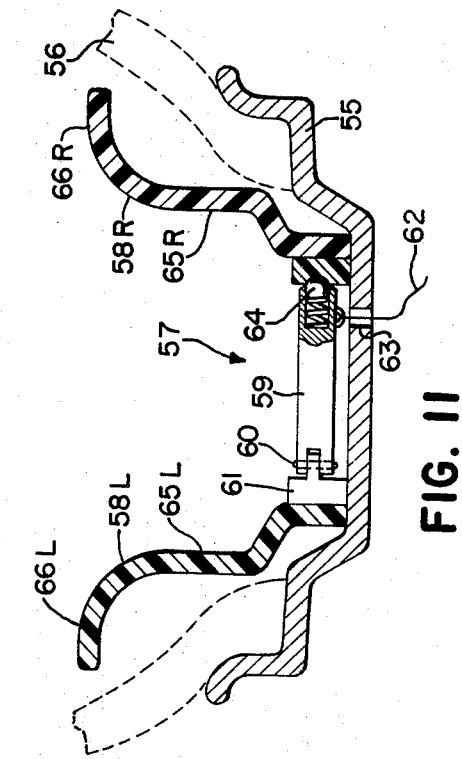
FIG. 11 is a cross-sectional view of still another embodiment of the tire support device mounted on a one-piece drop center rim.

FIG. 11 shows an embodiment usuable with a one-piece drop center rim 55 having a tire 56 mounted thereon. The support device 57 has a pair of substantially identical ring members 58L and 58R held in position by a plurality of circumferentially spaced retaining pivot arms 59 which urge the rings 58L and 48R axially outwardly against the beads of the tire 56. Each pivot arm 59 is pivotally attached by pin 60 to a bracket 61 on the ring 58L. The ring 58L is first placed on the rim with all the arms 59 folded back against the ring 58L. A common pull line 62 is connected to all the arms 59 and extends through access hole 63 in the rim. After the ring 58R is positioned on the rim 55 the line 62 is pulled to position all the arms 59 in the position shown in FIG. 11 between rings 58L and 58R. The spring biased detent 64 holds the arm in position. After the arms 59 are in position the hole 63 is sealed with a suitable elastomeric plug not shown. Each ring 58L and 58R has a radially outwardly extending portion 65L and 65R which curves axially outwardly and merges into an axially outwardly extending tread support portion 66L and 66R. In order to position the ring members 58L and 58R on the rim 55, it may be necessary to divide them into at least two arcuate segments which are removably connected together by pins 67 as shown in FIG. 12. It is also possible that some of the other ring members in some of the previously described embodiments may also preferably be made in at least two arcuate segments which are connected together to facilitate mounting the rings on the wheel rim. The mounting of the rings on the rim is of course easier when a split rim is used.

FIG. 13 shows another means of mounting a tire support device 68 on a drop center rim 69 with a tire 70 thereon. The support device 68 has substantially identical annular rings 71L and 71R positioned on each side of the rim 69 and held in spaced relationship by a plurality of pivot arms 72 pivotally connected by pins 73 to brackets 74 on the ring 71L. The arms 72 are placed in a radially outwardly position until the ring 71R is positioned on the rim 69. The arms 72 are then swung to the axial position shown by the dotted line by pulling on the pull line 75 extending through the access hole 76. The access hole is later plugged in the same manner as the hole 63 in FIG. 11. The rings 71L and 71R are made in two arcuate parts as shown in FIG. 12. The support device 68 functions in supporting a flat tire in the same manner as the support device 4 in FIG. 1.

FIG. 14 shows an embodiment similar to that shown in FIG. 3 except that it has an additional axially extending flange which merges with an additional curved portion. The tire support device 77 shown in FIG. 14 has a pair of identical annular rings 78, one of which is shown. The ring 78 is comprised of a series of axially extending hoop portions 79, 80, 81 and 82 integrally connected together respectively by ring portions 83, 84 and 85. The ring portions 83 through 85 are semicircular in cross section and alternately curve axially inwardly and axially outwardly. The hoop member 79 encircles the base of the rim 2 and is fastened in a manner similar to that shown in FIG. 1. The curved portion 83 retains the bead of the tire 3 on the bead seat. The curved portion 85 limits axially inward movement of the tire sidewall 86. The hoop portion 82 supports the axially outer portion of the tire tread when the tire is deflated. The hoop portions 81 and 82 are deflectable in the radial direction. This is particularly true of the unsupported axially inner edge of the hoop portion 82, but it also is true to some extent of the other hoop 81. The ring portions 83 through 85, on the other hand, are substantially rigid in the radial direction. The combination of the hoop portions 81 and 82 and the ring portions 83 through 85 provide the overall annular tire support device 77 with sufficient rigidity to support the tire in a run flat condition while having sufficient resiliency to reduce the shock loads caused by road impacts and reduce the transmission of such loads to the suspension system of the vehicle on which the wheel is mounted and to increase the load bearing surface of the tire during a run flat condition.

This combination of rigidity and resiliency is also present in the other embodiments shown herein which combine axially extending resilient hoop portions with rigid ring portions having a curved cross section.

As used herein, the terms "deflated" or "run flat condition" means that the tire being described or claimed has an internal pressure of either zero psi or a pressure substantially less than normal operating pressure.

Various cross-sectional contours besides those shown herein can be used for the tire support device and various means of mounting the tire support device on the rim can be used to mount the devices shown herein. These and various other modifications may be made in the embodiments shown herein without departing from the scope of the invention.

We claim:

1. A run flat device for use in conjunction with a pneumatic tire and rim assembly comprising:
    A. a pair of annular axially spaced apart members for supporting each axially outer portion of the tread of the tire when the tire is deflated, each of said spaced apart members comprising:
        1. an annular side ring portion extending radially outwardly from the base of the wheel rim when the device is mounted thereon,
        2. an axially extending resilient hoop portion concentrically spaced between the base of the wheel rim and an axially outer portion of the tire tread,
        3. said hoop portion having one axial edge supported by the side ring and the opposite edge unsupported to permit deflection in the radial direction when the hoop portion is subjected to radial loads, and
    (B) means for retaining said spaced apart members in a fixed position relative to axial direction with respect to the rim.

2. A run flat device as claimed in claim 1 for use with a tire of belted construction wherein the spaced apart member support the tread axially inwardly of the axially outer edges of the belt when such tire is deflated.

3. A run flat device as claimed in claim 1 wherein the annular spaced apart members are spaced axially inwardly from the axially inner surface of the tire bead and sidewall when the tire is inflated and unloaded.

4. A run flat device as claimed in claim 1 wherein the annular spaced apart members include means to prevent excessive axial shifting of the tire sidewall upon deflation of the tire.

5. A run flat device as claimed in claim 1 including bead retaining means to prevent excessive axially inward movement of the tire beads off the bead seat portion of the rim.

6. A run flat device as claimed in claim 1 wherein the hoop portion has an annular flange extending axially inwardly from a location adjacent each sidewall toward the axial center of the tire.

7. A run flat device as claimed in claim 1 wherein the device is used with a split rim and is fastened to the rim by flanges extending radially inwardly between halves of the split rim.

8. A run flat device as claimed in claim 1 wherein the device comprises two substantially identical annular members positioned within the tire chamber in opposed relationship to each other.

9. A run flat device as claimed in claim 1 wherein each side ring portion substantially conforms to the cross sectional contour of the inner surface of the adjacent tire bead and sidewall and is spaced in close proximity to said inner surface of the bead and sidewall when the tire is inflated.

10. A run flat device as claimed in claim 6 wherein the side ring of each spaced apart member has a radially outwardly extending substantially C-shaped arcuate portion which curves convexly axially outwardly then merges with the axially inwardly extending flange which comprises the hoop portion.

11. A run flat device as claimed in claim 8 wherein each annular member has a radially outwardly extending portion of substantially S-shaped cross section which curves axially inwardly from a position adjacent the tire bead then curves axially outwardly and merges with an axially outwardly extending flange which comprises the hoop portion.

12. A run flat device as claimed in claim 1 wherein each hoop portion has an outer circumferential surface inclined at an angle with respect to the axis of the wheel and tire and wherein the axial width of one hoop portion differs from the other.

13. A run flat device as claimed in claim 1 wherein one of the hoop portions has a larger outside diameter than the other.

14. A run flat device as claimed in claim 1 including means for reducing the friction between the hoop portion and the tire.

15. A run flat device as claimed in claim 14 wherein the means for reducing the friction is a plurality of annular coaxial low friction bearing rings mounted on the outer periphery of each hoop portion for supporting the tire tread.

16. A run flat device as claimed in claim 14 wherein the means for reducing the friction is a surface on the hoop portion having a low coefficient of friction.

17. A run flat device as claimed in claim 14 wherein the means for reducing the friction is a lubricant which is releasable upon deflation of the tire.

18. A run flat device as claimed in claim 1 wherein each spaced apart tire tread supporting member includes a plurality of webs extending between the side ring portion and the hoop portion.

19. A run flat device as claimed in claim 1 wherein the device is used on a one-piece rim and the means for retaining the annular tire tread support members in said fixed position includes a plurality of pivot arms which are swung into an axial position extending between the annular tire tread support members.

20. A run flat device as claimed in claim 1 wherein the annular spaced apart members support the tire axially inwardly of the axially outer edges of the ground contacting surface of the tire tread.

21. A run flat device as claimed in claim 1 wherein each annular member has a plurality of concentric hoop portions integrally connected by a plurality of side ring portions having a semicircular cross section.

22. A run flat device as claimed in claim 1 used on an axially split rim wherein each spaced apart member has a radially inwardly extending flange which extends in side-by-side relationship with the flange on the opposite spaced apart member, said flanges being secured between the two halves of the split rim to hold the run flat device in a fixed position with respect to the rim.

23. A safety support device for use on a wheel rim having a pneumatic tire thereon, the device comprising:

A. a pair of spaced apart annular side portions, each lying adjacent to the axially inner surface of a tire bead and sidewall;

B. an axially extending intermediate portion joining said side portions and holding them in spaced apart relationship within the tire chamber;

C. each of said side portions having a cross-sectional contour substantially opposite to that of the other side portion;

D. each side portion comprising:
1. bead retaining means to prevent excessive axial movement of the tire bead,
2. sidewall buffer means extending radially outwardly from the bead retaining means and spaced from the sidewall of the tire, to limit excessive axially inward movement of the tire sidewall upon deflation of the tire, and
3. a tread support means spaced radially inwardly of a portion of the tread axially inwardly of the shoulder of the tire and spaced axially from the tread support means on the other side portion.

24. A safety support device for use on a wheel rim having a pneumatic tire thereon, the device comprising:

A. a pair of axially spaced apart annular side portions;

B. an axially extending intermediate portion joining said side portions and holding them in spaced apart relationship when mounted on a wheel rim;

C. each of said side portions having a cross-sectional contour substantially opposite to that of the other side portion;

D. each side portion comprising:
1. a substantially radially extending portion spaced from the sidewall of the tire,
2. a substantially axially extending circumferentially continuous tire tread support portion for supporting a portion of the tire from inside thereof when deflated, and
3. a curved resilient portion joining the radially extending portion and the tread support portion to permit relative deflection of the two joined portions when the tire tread support portion is subjected to dynamic load as when the tire is deflated.

25. A safety support device as claimed in claim 24 wherein the curved portion joins with the axially inner edge of the tread support portion.

26. A safety support device as claimed in claim 24 wherein the curved portion joins with the axially outer edge of the tread support portion.

* * * * *